(12) United States Patent
Ho et al.

(10) Patent No.: US 6,297,833 B1
(45) Date of Patent: Oct. 2, 2001

(54) BUMP MAPPING IN A COMPUTER GRAPHICS PIPELINE

(75) Inventors: Shaun Ho, Cupertino; Douglas H. Rogers, Sunnyvale; Paolo Sabella, Pleasanton, all of CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 09/274,985

(22) Filed: Mar. 23, 1999

(51) Int. Cl.[7] ................................................. G06T 11/40
(52) U.S. Cl. ................................................. 345/581; 345/582
(58) Field of Search .................................... 345/429, 430, 345/431, 581, 582, 584

(56) References Cited

U.S. PATENT DOCUMENTS

| | | | | |
|---|---|---|---|---|
| 5,870,102 | * | 2/1999 | Tarolli et al. | 345/430 |
| 5,892,516 | * | 4/1999 | Alexander | 345/430 |
| 6,005,584 | * | 12/1999 | Kitamura et al. | 345/430 |
| 6,133,923 | * | 10/2000 | Ozawa | 345/430 |

* cited by examiner

*Primary Examiner*—Matthew Luu
(74) *Attorney, Agent, or Firm*—Girard & Equitz LLP

(57) ABSTRACT

A graphics accelerator pipeline including a rasterizer stage, a texture stage, and a combiner stage capable of producing realistic output images by mapping irregular textures to surfaces.

5 Claims, 4 Drawing Sheets

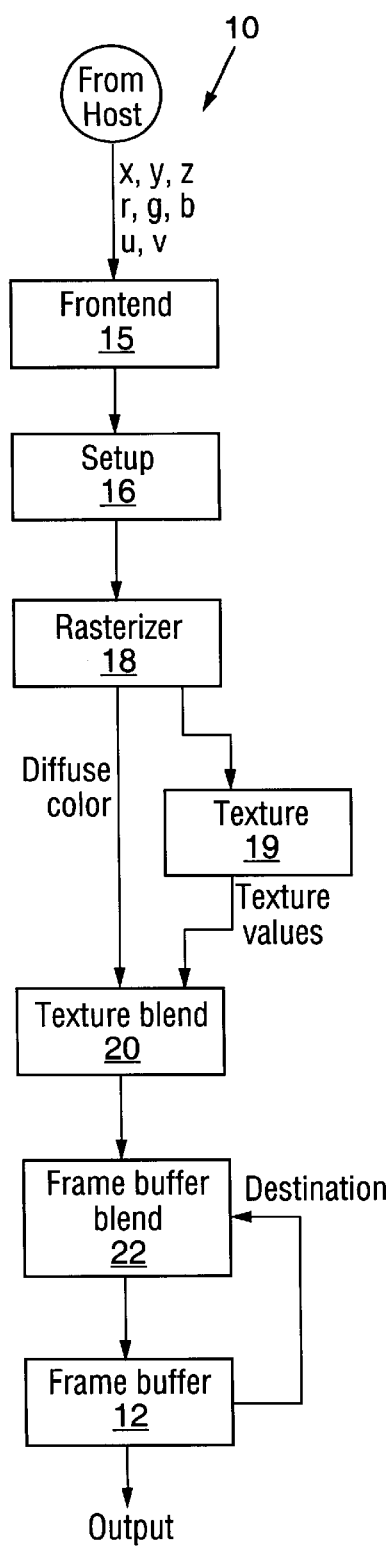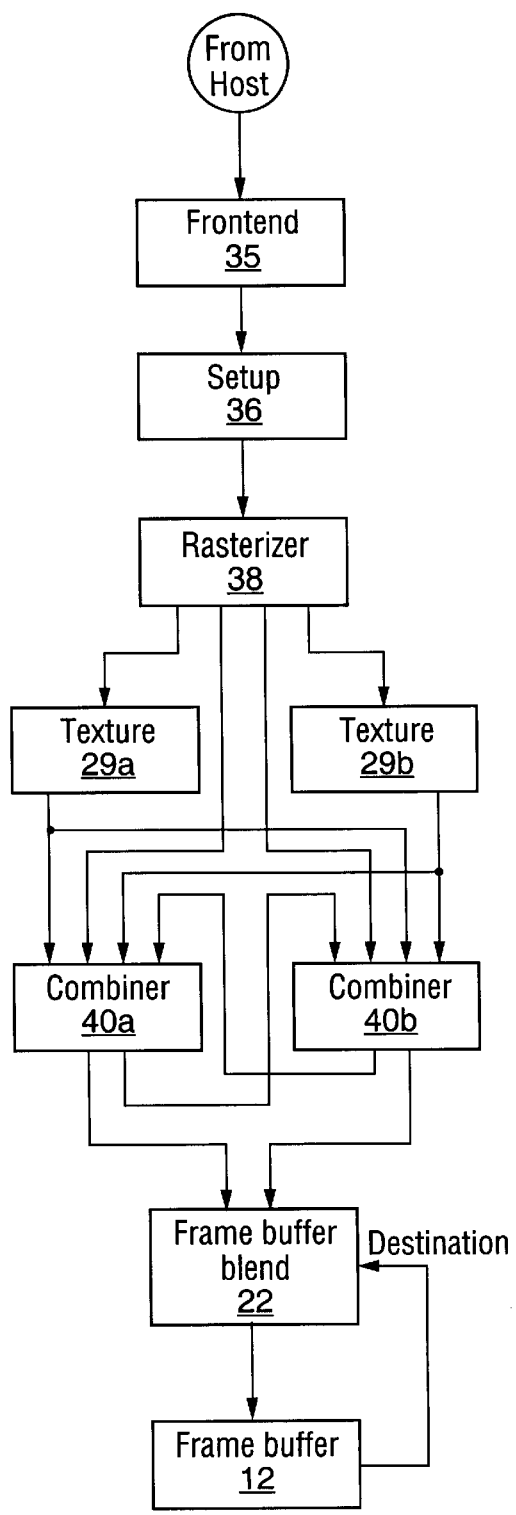
FIG. 1
(PRIOR ART)
FIG. 7

BUMP MAPPING IN A COMPUTER GRAPHICS PIPELINE

BACKGROUND OF THE INVENTION

1. Field of the Invention

This invention relates to computer display systems and, more particularly, to methods and apparatus for providing a graphics accelerator capable of providing bump mapping.

2. History of the Prior Art

In three dimensional graphics, surfaces are typically rendered by assembling a plurality of polygons in a desired shape. The polygons are conventionally triangles having vertices which are defined by three dimensional coordinates in world space, by color values, and by texture coordinates.

To display a surface on a computer monitor, the three dimensional world space coordinates are transformed into screen coordinates in which horizontal and vertical values (x, y) define screen position and a depth value (z) determines how near a vertex is to the screen and thus whether that vertex is viewed with respect to other points at the same screen coordinates. The color values (r, g, b) define the brightness of each of red/green/blue colors at each vertex and thus the color (often called diffuse color) at each vertex. Texture coordinates (u, v) define texture map coordinates for each vertex on a particular texture map defined by values stored in memory.

A texture map typically describes a pattern to be applied to the surface of the triangle to vary the diffuse color in accordance with the pattern. The texture coordinates of the vertices of a triangular surface area fix the position of the vertices of the triangle on the texture map and thereby determine the texture detail applied to each portion of the surface within the triangle in accordance with the particular texture . In turn, the three dimensional coordinates of the vertices of a triangle define the plane in which the texture map and the surface lie with respect to the screen surface.

A texture which is applied to a surface in space may have a wide variety of characteristics. A texture may defined a pattern such as a stone wall. It may define light reflected from positions on the surface. It may describe the degree of transparency of a surface and thus how other objects are seen through the surface. A texture may provide characteristics such a dirt and scratches which make a surface appear more realistic. A number of other variations may be provided which fall within the general description of a texture.

One problem with prior art computer graphics pipelines is that the images which are generated are somewhat unrealistic. The images generated appear too smooth to the eye and include none of the irregularities of a typical surface in the real world.

It is desirable to provide a new computer graphics pipeline capable of providing more realistic output images.

SUMMARY OF THE INVENTION

The present invention is realized by a graphics accelerator pipeline including a rasterizer stage, a texture stage, and a combiner stage capable of producing realistic output images by mapping irregular textures to surfaces.

These and other features of the invention will be better understood by reference to the detailed description which follows taken together with the drawings in which like elements are referred to by like designations throughout the several views.

BRIEF DESCRIPTION OF THE DRAWINGS

FIG. 1 is a block diagram illustrating a computer graphics pipeline constructed in accordance with the prior art.

FIG. 7 is a block diagram illustrating a computer graphics pipeline designed to allow the practice of computer bump mapping in accordance with the present invention.

DETAILED DESCRIPTION

Figure 2:
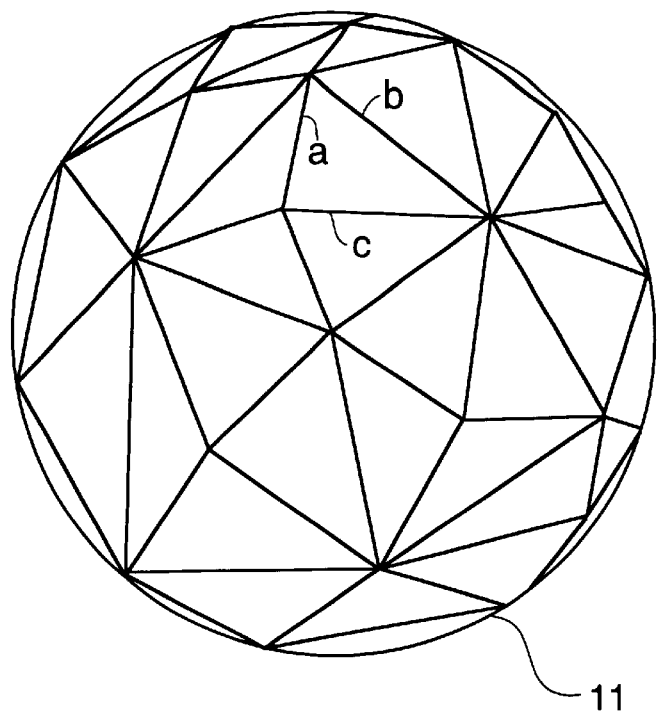
FIG. 2 depicts a sphere which is described on a two dimensional output display by the generation of a series of triangular surfaces.

FIG. 1 illustrates a block diagram of a computer graphics pipeline 10 constructed in accordance with the prior art. The pipeline 10 includes a plurality of stages for rendering pixels defining a three dimensional image to a frame buffer 12 from which the image may be provided at an output stage 13, typically an output display.

The pipeline 10 includes a front end stage 15 at which data positioning each of a plurality of triangles defining an output image is received and decoded. The front end stage 15 receives from an application program the data defining each of the vertices of each triangle which is to appear in the output image being rendered to the frame buffer 12. This data may include the three dimensional world coordinates of each of the vertices of each triangle, red/green/blue color values at each of the vertices, texture coordinates fixing positions on a texture map for each of the vertices for each texture to be used in modifying the color values of each triangle, and various factors for combining the textures and color values.

The front end stage 15 determines the manner and order in which the pixels of the various triangles will be processed to render the image of the triangle. When this processing order has been determined, the front end stage 15 passes the data defining the vertices of the triangle to a setup stage 16. The setup stage 16 carries out a number of processes known to those skilled in the art that make the operations of generating pixels and applying textures to those pixels progress rapidly. The processes actually carried out by the setup stage 16 may vary depending on the particular implementation of the graphics accelerator. In some circuitry, certain of these processes are implemented by a rasterizer stage 18 and a texture stage 19 which follow the setup stage.

The setup stage 16 utilizes the world space coordinates provided for each triangle to determine the two dimensional coordinates at which those vertices are to appear on the two dimensional screen space of an output display. If the vertices of a triangle are known in screen space, the pixel positions vary linearly along scan lines within the triangle in screen space and may be determined. The setup stage 16 and the rasterizer stage 18 together use the three dimensional world coordinates to determine the position of each pixel defining each of the triangles. Similarly, the r, g, b color values of a triangle vary linearly from vertex to vertex in world space.

Consequently, setup processes based on linear interpolation of pixel values in screen space, linear interpolation of depth and color values in world space, and perspective transformation between the two spaces will provide pixel coordinates and color values for each pixel of each triangle being described. The end result is that the rasterizer stage 18 generates in some sequence screen coordinates and red/green/blue color values (conventionally referred to as diffuse color values) for each pixel describing each triangle.

The setup stage 16 and the rasterizer stage 18 also cooperate in the computation of the texture coordinates for each texture for each pixel in each triangle and send those texture coordinates to a texture stage 19. The texture coordinates vary linearly from vertex to vertex in world space since the texture map is applied to the surface in world space. Because the texture coordinates vary linearly, texture coordinates at any position throughout the triangle may be determined in world space and related to the pixels to be displayed in screen space through processes combining linear interpolation and perspective transformation. The texture coordinates generated are then utilized by the texture stage 19 to index into the particular texture map to determine tells (texture color values at the position defined by the texture coordinates for each pixel). These texture color values are used to vary the r, g, b color values for the pixel. Often the texture stage 19 interpolates tells at a number of positions surrounding the texture coordinates at the center of a pixel to determine a texture value for the pixel. In one arrangement, tells from four positions surrounding the texture coordinates of the pixel are interpolated to determine a texture value for the pixel. The end result is that the texture stage 19 generates in some sequence a texture value for each pixel describing each triangle.

The results provided by the rasterizer and texture stages 18 and 19 are furnished to a texture blend stage 20 in which the diffuse color values generated by the rasterizer for each pixel are blended with the texture values for the pixel in accordance with some combinatorial value often referred to as alpha. Typically, an alpha value is carried as a component of the texture values which is used to determine the amounts of each of the r, g, b color values and the texture values to be included in the final color values defining that particular pixel. The output of the texture blend stage 21 is a sequence of color values defining the color values pixels of the particular triangle as blended with a first texture.

Although other stages (not shown) may be included in the pipeline for other effects, the sequence of color values defining the pixels of the particular triangle blended with texture values representing a first texture generated by the texture blend stage 20 are transferred to a frame buffer blending stage 22. In the frame buffer blending stage, the sequence of color values defining the pixels of the particular triangle blended with the first texture are combined with the values for those pixels already in the frame buffer 12 at the screen position of the triangle in a read/modify operation. Then, the color values for the pixels produced by the frame buffer blend stage 22 are stored in the frame buffer 12 replacing the values previously at the pixels positions defining the triangle.

There have been various methods suggested for providing irregularities for surfaces depicted on a computer output display in order to make those surfaces appear more realistic. One technique, often called bump mapping, is described by James Blind in an article entitled *Simulation of Wrinkled Surfaces*, published August 1978, Computer Graphics Proceedings. The article points out that a primary reason for the failure of earlier attempts to provide irregularities which appear realistic through texture mapping techniques was a failure to correlate the light sources used for generating the surfaces and those used for generating the irregularities depicted on the surfaces of the objects. Blind points out that the primary effect of surface irregularities is a variation in the intensity of light reflected caused by the effect of the irregularities on the surface normal.

The Blind paper suggests algorithms for accomplishing bump mapping utilizing computer software. However, such processes have never been implemented in the hardware of a computer graphics pipeline because no computer pipeline has included hardware capable of accomplishing these operations at a realistic rate. Consequently, bump mapping, when carried out at all, is executed by the host processor. Because the process is quite complicated, the practice of bump mapping by the host processor significantly slows the generation of graphics images.

A new computer graphics pipeline has now been designed which is admirably adapted to practicing bump mapping at a rate such that the process can be incorporated without slowing the generation of graphics images appreciably.

The process practiced to carry out bump mapping will be better understood from the following description. A three dimensional object is typically rendered on a computer output display by assembling a plurality of plane surfaces (normally triangles) in an arrangement which depicts the desired object. In FIG. 2, the outline of a sphere 11 is illustrated. As may be seen, the sphere 11 of FIG. 2 is generated from such an assembly of triangular surfaces.

Figure 3:
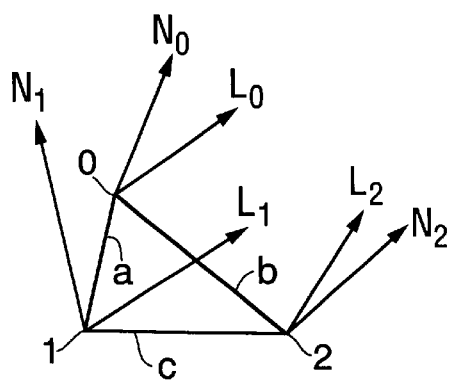
FIG. 3 is a diagram illustrating a single one of the triangular surfaces used to depict the sphere of FIG. 2.

One of the triangles (having sides a, b, and c) which is used to depict the sphere 11 is illustrated separately in FIG. 3. As may be seen, this triangle has three vertices separately indicated as vertices 0, 1, and 2. At each vertex of the triangle, a vector normal to the surface of the sphere 11 is illustrated. The normal vector $N_0$ is illustrated projecting from the vertex 0, the normal vector $N_1$ is illustrated projecting from the vertex 1, and the normal vector $N_2$ is illustrated projecting from the vertex 2. Each of these normal vectors extends in a separate direction from its associated vertex because the vector is normal to the surface of the sphere 11 at the vertex of the triangle, not to the triangle. Each of these normal vectors is often referred to as a "shading normal." The shading vector is actual normal to a surface which is tangent to the surface of the object being depicted (e.g., the sphere) at the particular vertex of the triangle. The surface normal $N_0$ may be computed as the cross product of two vectors $T_u$ and $T_v$ (see FIG. 4) which define the tangent to the surface at the particular vertex.

Associated with each vertex is also a lighting vector (designated $L_0$, $L_1$, and $L_2$ to match the vertices) which indicates the direction of lighting from a source (in this description, a single source is presumed) at each of the vertices of the triangle. The dot product of the light vector and the surface normal vector provides the diffuse lighting value at the particular point at which the vertex lies. Thus, using the x, y, and z components of each of the surface normal vector and the light vector:

Diffuse shading=Nx*Lx+Ny*Fly+Nz*Lz.

Figure 4:
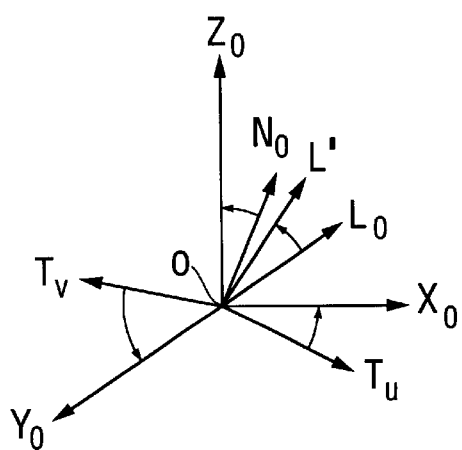
FIG. 4 is a diagram illustrating rotation of vectors originally provided in one coordinate system in which the surface of FIG. 3 appears into a different coordinate system related to a display screen.
Figure 5:
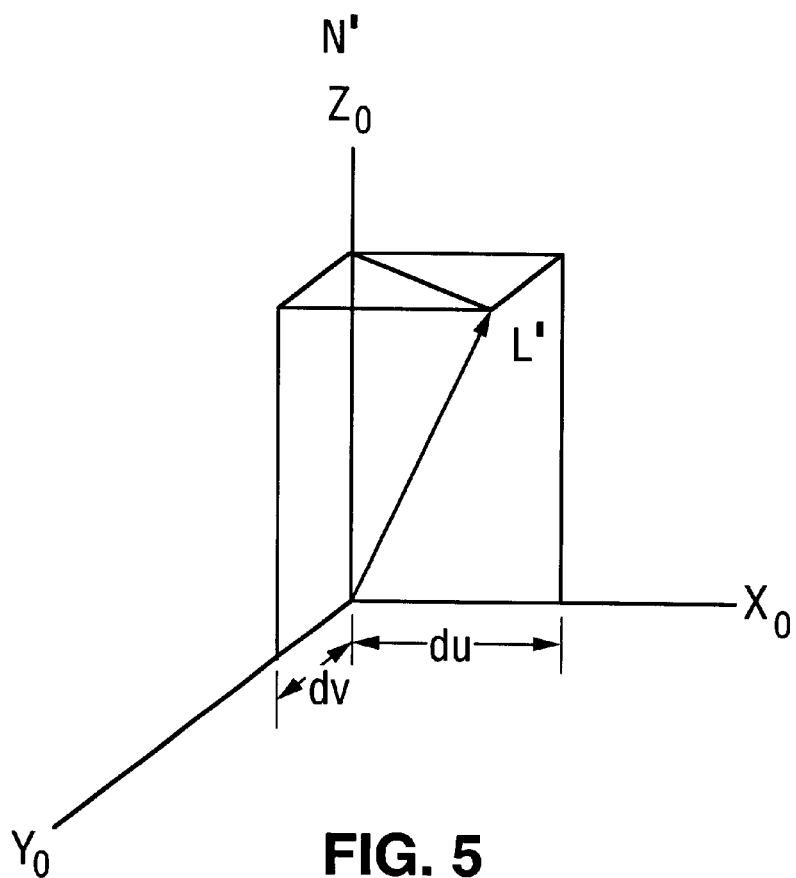
FIG. 5 is a diagram illustrating components of a lighting vector which has been rotated to a different coordinate system.

In order to reduce the calculations necessary to carry out the algorithm, the surface normal at each vertex of the triangle may be rotated into a new coordinate system in which the surface normal projects along the Z axis of the display in manner such as is represented in FIG. 4 and the vectors $T_u$ and $T_v$ which create the tangent to the surface of the sphere at the vertices are aligned with the X and Y axes. The shading normal is also normalized to a value of one by dividing by its length. In this coordinate system, the x, y, and z components of the surface normal are equal to 0, 0, 1. To correctly associate the light vector and the surface normal at each of the vertices so that the intensity effect remains correct, the light vector is rotated through the same transformation to a new position L in the new coordinate system and normalized. In this new position, the light vector has components in each of the X, Y, and Z directions of the new coordinate system. These components are illustrated in detail in FIG. 5. However, since the surface normal has been normalized to one and has neither x or y components, diffuse shading=1.0*Lz.

However, each of the x and y components of the light vector at each of the vertices represents a change in the texture coordinates of the texture map representing the irregularities at that vertex. These differences in the texture coordinates describe the light vector difference at each of the vertices. Since the normal vectors and light vectors have been normalized, the differences in the texture coordinates (if equal to one) are equal to an offset of one telex in the bump texture map.

Figure 6:
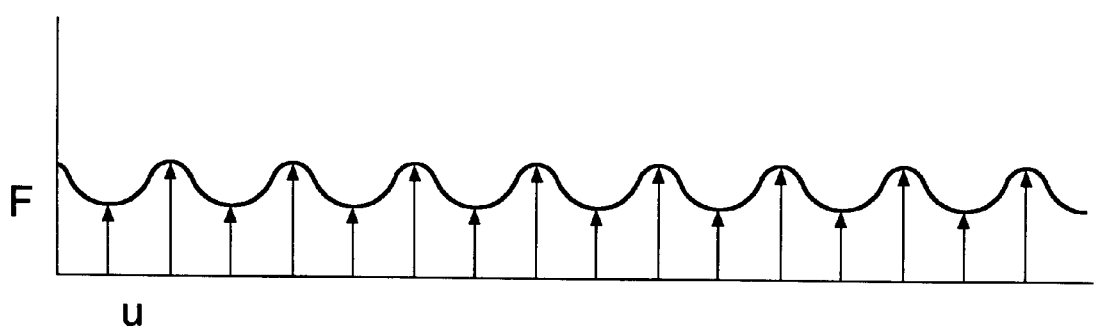
FIG. 6 illustrates a texture map defining irregularities to be combined with a surface to be rendered by a computer display.

In order to obtain a realistic lighting effect from bump mapping, the shading normal vector is perturbed by a texturing function which is the subject of a texture map (called a bump map in this specification). For example, an irregular surface such as that illustrated by the light intensities illustrated in FIG. 6 might be generated as a texture map to be combined with an image of a surface to be displayed. Blind describes this as a new point in an irregular surface displaced in the direction of the surface normal by an amount equal to the value of F (u, v) described by the bump map. Thus, New position P'=original position P+AN, and Pu'~=Pu+FuN and Pvt'~=Pv+FvN.

As pointed out, in this new position, the light vector has components in each of the X, Y, and Z directions of the new coordinate system.

Thus, the new normal becomes:

N'=(Pu+FuN) X (Pv+FvN).

Since the tangent vectors Tub is 1, 0, 0 and TV is 0, 1, 0 in tangent space, then N'={-Fu,-Fv, 1}, and (N'dot L')=-FuLx'-FvLy'+Lz'.

By the total differential theory, (N'dot L')=-(F(u+Lx', v+Ly')+Lz';

or (N'dot L')=F(u, v)-F(u+Lx', v+Ly')+Lz.'.

This can be stated as the new dot product of the surface normal and the lighting vector is equal to a value reached using the original texture coordinates less a value reached using the offset texture coordinates plus the diffuse shading value.

In order to apply the texture map to the surface of a triangle following this concept, an application program may transfer texture coordinates for a bump texture map describing each of the vertices to the graphics accelerator along with other information describing those vertices such as diffuse color values, and x, y, and z coordinates. These texture coordinates are interpolated across the triangle in the manner described to determine texture coordinates for each pixel of the triangle. The texture coordinates provided by the application program at each vertex are each also incremented by the amount of the difference in texture coordinates determined in the manner described above from the dot product of the surface normal and the lighting vector at each vertex. These new texture coordinates are also interpolated for each pixel position across the triangle.

In order to combine the irregular texture represented by a bump texture map to the surface of a triangle, as the diffuse color for each pixel is generated by the rasterizer, the texture coordinates for the various texture maps to be blended are also generated. For a bump texture map, a first and second pair of texture coordinates are generated, a first derived from the interpolated values of the texture coordinates provided by the application program and the second provided by the interpolated values of those texture coordinates incremented by the offsets determined from computing the transformed lighting vector (e. g., by rotating the surface normals and lighting vectors to the new coordinate systems). These values are looked up in the texture map for each pixel by the texture stages of the new graphics pipeline and subtracted to reach a value to be blended with diffuse color to represent the bump map. Blending in this manner may be expressed as:

Col*(N'dot L')=Col*(F(u, v)-F(u+Lx', v+Ly'))+Col*Lz'.

It will be understood that there are many other methods for computing the various values described in this specification such as the shading normal vector and the offset values for the texture coordinates obtained through the dot product of the shading normal and the lighting vector at each vertex. Some of these methods are more precise while some execute more rapidly. The examples given above are merely representations of an embodiment which is readily understandable by those skilled in the art. The other methods known to those skilled in the art are also readily practiced utilizing the present invention.

The present invention utilizes a new graphics pipeline that allows these processes to be implemented to rapidly produce bump mapping effects. To accomplish this, the new graphics pipeline includes a number of new and unique processing stages.

FIG. 7 is a block diagram illustrating components of a new graphics pipeline in accordance with the present invention. The new graphics pipeline includes front end, setup, and rasterizer stages 35, 36, and 38 which accomplish the functions described in detail above with respect to similar stages illustrated in FIG. 1. In addition to the usual functions accomplished by rasterizers of the prior art, the pipeline includes a pair of texture stages 29a and 29b each of which is adapted to produce texture values in the manner described in detail above for individual textures being applied to a surface. In other embodiments, additional texture stages may be incorporated into the pipeline in the manner described herein.

Each texture stage 29a and 29b is adapted to receive input signals which include texture coordinates for each of the pixels of a triangle being rendered as the individual pixel coordinates are simultaneously generated by the rasterizer stage 38. Each texture stage also receives a texture identification (id) value indicating a texture to be mapped to the triangle. The texture identification sent to each of the texture stages may be the same or different but in the operation being described is the same.

Each texture stage is capable of utilizing one set of texture coordinates furnished to generate a texture value using the texture map identified for one set of pixel coordinates. The texture coordinates sent to one texture stage may be those furnished by the application program after computation by the rasterizer, while the texture coordinates furnished to the other texturizer may be those computed with the differences obtained from the dot product calculations for the vertices computed in the manner described above. Since an application program is producing two sets of texture values from the same bump texture map during any clock interval of the pipeline, each texture stage receives the same texture map identification as an input value. However, one of the texture stages is furnished the unique texture coordinates furnished by the application program for the individual pixels, while the other texture stage is furnished the unique texture coordinates varied by the amounts of the offset values determined. This causes the two texture stages 29a and 29b to generate sequences of texture values from a single texture map each of which may be blended with the diffuse colors of one of the pair of pixels generated by the rasterizer 38 in a single pass through the pipelne.

Each texture stage provides a texture value output for the set of texture coordinates utilized. Thus, the outputs produced by the two texture stages 29a and 29b are two sequences of texture values from the bump map differing by the amount of the offsets determined through the coordinate rotation process. These two sets of texture values are furnished to the combiner stages or stages which follow, are subtracted, and a result produced which is combined with the diffuse color values of the pixels which are simultaneously being furnished by the rasterizer stage 38.

In addition to the multiple texture stages 29a and 29b, the pipeline of the present invention shown in FIG. 7 also includes two combiner stages 40a and 40b and does not include the texture blend stage of the prior art. The combiner stages 40a and 40b each are capable of receiving input from a plurality of possible sources. For example, the combiner stages may each utilize as input, among other values, the output texture values produced by either of the texture stages 29a and 29b, the diffuse color output of the rasterizer stage 38, the output of the other combiner stage, and input signals defining various factors useful in combining various textures and colors together. A detailed description of a graphics pipeline including combiner stages is provided in U.S. patent application Ser. No. 09/273,975, D. Kirk et al, filed on Mar. 22, 1999, and assigned to the assignee of the present invention.

Figure 8:
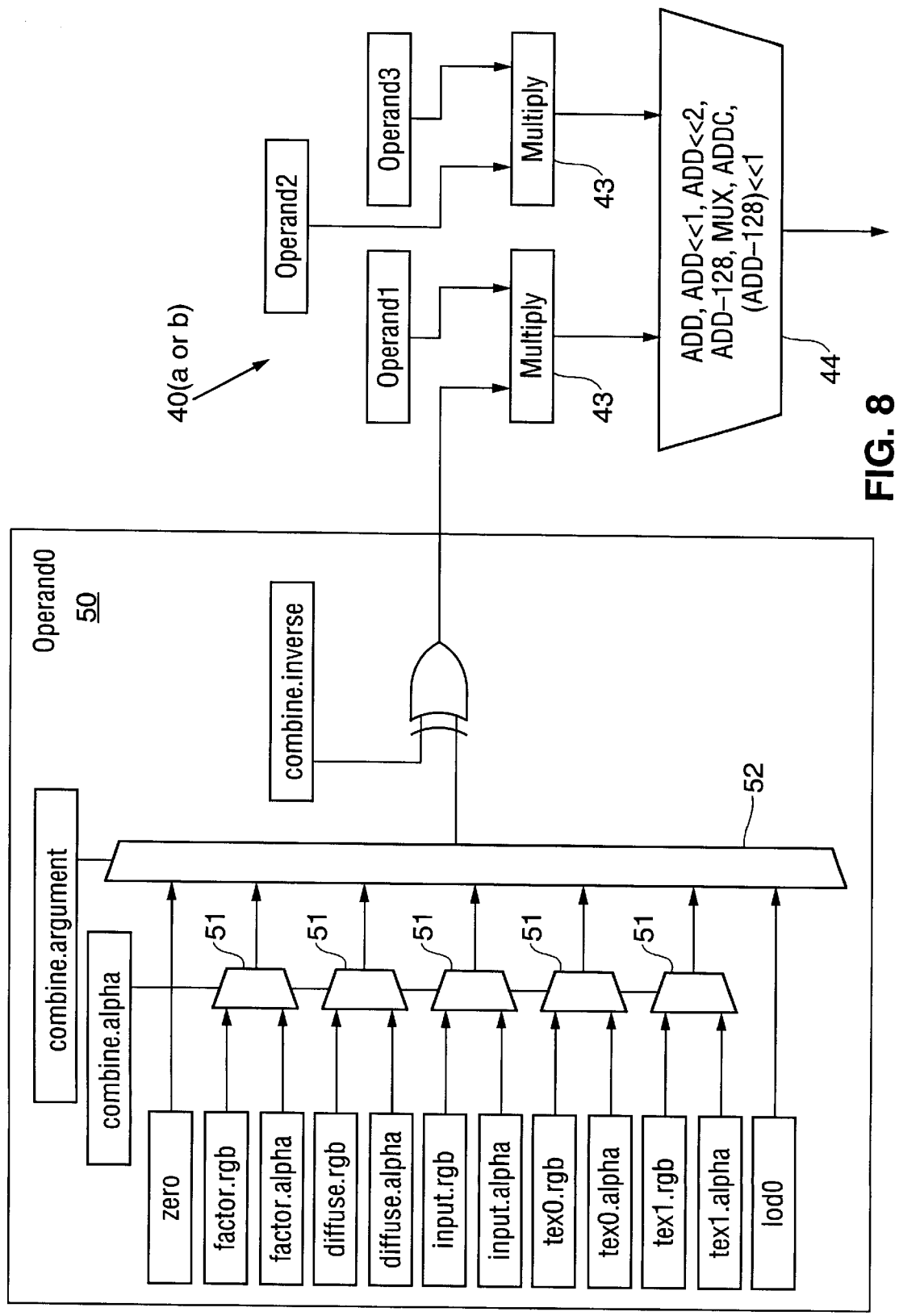
FIG. 8 is block diagram illustrating in more detail one portion of the computer graphics pipeline of FIG. 7

The combiner stages allow the diffuse color image furnished by the rasterizer stage 38 to be combined with each of at least two individual textures during the same pass through the pipeline. These stages also allow a plurality of other functions to be accomplished which greatly accelerate the operation of the pipeline. FIG. 8 is a block diagram describing the general form of the combiners 40a and 40b which should help to better illustrate their facilities. As FIG. 8 illustrates, each of the combiners includes a pair of multiply circuits 43 the output from each of which provides input to an add circuit 44. Each of the multiply circuits 43 is organized to multiply two input operands together and furnish the result as output. In contrast to prior art circuits which allow the blending of at most two textures and a single set of diffuse color pixels, the two input operands of each of the two multiply circuits may each be selected from any of a number of different sources among which are those described in the figure. This allows combinations to be accomplish in a single pass through the pipeline which could not be accomplished in any realistic manner by prior art circuitry. The add circuit 44 adds the results of the two multiplications accomplished by the multiply circuits 43 and accomplishes certain other operations.

As those skilled in the art will recognize, the typical operation by which a texture is mapped to a triangle utilizes a factor for selecting the amount of each diffuse pixel color to combine with the texture value color for that pixel. Typically, the factor is included with the texture information as an alpha value between zero and one. One of the two elements to be combined is multiplied by the alpha value while the other is multiplied by one minus the alpha value. This assures that each color will be made up of some percentage of diffuse color and a remaining percentage of a modifying texture color as determined by the alpha.

As may be seen, the combiners 40a and 40b are each adapted to easily handle the blending of textures with diffuse images in this manner. If the diffuse color pixels defining the triangle and an alpha value provided with the texture information are furnished as the two operands to one of the multipliers 43, the result is the diffuse pixel color multiplied by the alpha value. Similarly, if the texture values related to each of those pixels and one minus the alpha value are furnished as operands to the other of the two multipliers 43, the result is the texture value for each pixel multiplied by one minus alpha. Then the result may be added by the add circuit 44 to map the texture to the triangle.

The two combiner stages are adapted to provide two individual streams of pixels combined with samples of textures. The outputs of each of the combiners may be used are inputs to the other of the combiners thereby allowing a multiplexity of combinations to be realized. In one embodiment, each pixel color value is combined with a set of texture values produced by one of the texture stages 29 selected to provide texture values at the correct pixel positions.

Thus, the control circuitry may be utilized to provide diffuse color values of pixels to the first and second combiners. Simultaneously, texture values for the pixels derived from a single texture map may be provided as input values to the first and second combiners to be blended with the diffuse color values of the pixels. This allows each combiner to blend values derived from the same texture map with pixels in the same clock interval.

On the other hand, the diffuse pixel colors for each pixel in the sequence may be provided to the same combiner 40a. At the same time, the texture values provided to the first and second combiners to be blended with the diffuse color values of the single pixel may differ in accordance with two different coordinates produced from the same texture map. The combiner 40a then blends a first texture with the stream of pixel color values and send the resulting stream of textured color values to the second combiner 40b to be combined with a second different texture in the same clock interval.

As will be understood, if more than two textures are to be mapped, then an embodiment having additional texture stages and combiners may be utilized.

It should also be noted that a pipeline utilizing a single combiner stage may be used to accomplish the same functions since the output of the stage may be routed as input so that multiple textures may be blended to each pixel. The above-identified patent application describes such an arrangement utilizing registers for providing inputs values to each of the multipliers 43 in response to control signals.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A graphics accelerator pipeline comprising
   a rasterizer stage for generating a first set of pixel coordinates and color values and a second set of pixel coordinates and color values in response to data indicative of each pixel of a polygonal primitive, wherein the first set and the second set together determine color values and pixel coordinates of a perturbed pixel corresponding to said each pixel, wherein a bump map determines which said perturbed pixel corresponds to said each pixel, a texture stage for generating texture values for selectable textures, wherein the texture stage is coupled to receive at least the pixel coordinates of the first set and the second set, and configured to generate a first texture value determined by a texture map in response to the pixel coordinates of the first set, and to generate a second texture value determined by the texture map in response to the pixel coordinates of the second set, and a combiner stage capable of producing realistic output images by mapping irregular textures to surfaces, wherein the combiner stage is coupled to receive the first set and the second set for said each pixel of the polygonal primitive, and the first texture value and the second texture value for said each pixel of the polygonal primitive, and is configured to generate textured color values for said each pixel of the polygonal primitive by blending the first texture value with the color values of the first set to generate first blended values, blending the second texture value with the color values of the second set to generate second blended values, and combining the second blended values with the first blended values.

2. A graphics accelerator pipeline as claimed in claim 1 in which the texture stage includes a plurality of individual texture stages for selectively generating texture values from identified texture maps, one of the individual texture stages is coupled to receive at least the pixel coordinates of the first set, and another one of the individual texture stages is coupled to receive at least the pixel coordinates of the second set.

3. A graphics accelerator pipeline as claimed in claim 2 in which the combiner stage includes a plurality of different combiner stages.

4. A graphics accelerator pipeline as claimed in claim 2 in which the combiner stage includes means for registering input values, and means for selecting from registers input values.

5. A graphics accelerator pipeline as claimed in claim 1, wherein the combiner stage is configured to generate the textured color values for said each pixel of the polygonal primitive by blending the first texture value with the color values of the first set to generate the first blended values, blending the second texture value with the color values of the second set to generate the second blended values, and subtracting the second blended values from the first blended values.

* * * * *